United States Patent
Itozaki et al.

(10) Patent No.: US 7,394,250 B2
(45) Date of Patent: Jul. 1, 2008

(54) MINE DETECTOR WITH NQR-SQUID

(75) Inventors: Hideo Itozaki, Tsukuba (JP); Kyoko Kawagishi, Tsukuba (JP); Tadayuki Kondo, Tsukuba (JP); Tadashi Shimizu, Tsukuba (JP); Kenjiro Hashi, Tsukuba (JP)

(73) Assignee: National Institute of Materials Science, Ibaraki (JP)

( * ) Notice: Subject to any disclaimer, the term of this patent is extended or adjusted under 35 U.S.C. 154(b) by 216 days.

(21) Appl. No.: 10/536,020

(22) PCT Filed: Nov. 21, 2003

(86) PCT No.: PCT/JP03/14910

§ 371 (c)(1),
(2), (4) Date: Nov. 17, 2005

(87) PCT Pub. No.: WO2004/049009

PCT Pub. Date: Jun. 10, 2004

(65) Prior Publication Data

US 2006/0113998 A1   Jun. 1, 2006

(30) Foreign Application Priority Data

Nov. 22, 2002   (JP) .............................. 2002-340086

(51) Int. Cl.
*G01V 3/00* (2006.01)
(52) U.S. Cl. ...................... 324/300; 324/307
(58) Field of Classification Search ................. 324/300, 324/307, 309
See application file for complete search history.

(56) References Cited

U.S. PATENT DOCUMENTS

| | | | | |
|---|---|---|---|---|
| 2,557,994 A | * | 6/1951 | Ostlund | 324/327 |
| 5,036,279 A | * | 7/1991 | Jonsen | 324/307 |
| 6,522,135 B2 | * | 2/2003 | Garroway et al. | 324/300 |
| 7,106,058 B2 | * | 9/2006 | Wilker et al. | 324/300 |

FOREIGN PATENT DOCUMENTS

| | | |
|---|---|---|
| JP | 4-326051 | 11/1992 |
| JP | 6-324021 | 11/1994 |
| JP | 8-262147 | 10/1996 |
| JP | 10-268013 | 10/1998 |
| WO | 99/50689 | 10/1999 |

OTHER PUBLICATIONS

12. Entrusted with DARPA Project at $4,500,000 Aiming for Development of Land-Mine Detection System, Superconductivity Communications, vol. 6, No. 6, Dec. 1997 [retrieval date Feb. 13, 2004], Internet <URL: http://www.chem.t.u-tokyo.ac.jp/appchem/labs/kitazawa/SUPERCOM/30/30_12.html>, with English translation.

* cited by examiner

*Primary Examiner*—Louis M Arana
(74) *Attorney, Agent, or Firm*—Wenderoth, Lind & Ponack, L.L.P.

(57) ABSTRACT

A portable small mine detecting device for detecting a mine by transmitting a radio wave and detecting the NQR of nitrogen 14 atoms (14N) contained in the mine using a high-sensitivity, high-temperature superconducting SQUID magnetic sensor. The mine detecting device can be applied to non-metal mines and can detect different kinds of explosive substances simultaneously.

20 Claims, 5 Drawing Sheets

MINE DETECTOR WITH NQR-SQUID

TECHNICAL FIELD

The invention of this application relates to a mine detecting device and, more particularly, to a mine detecting device for detecting a mine by detecting the NQR (Nuclear Quadrupole Resonance) of nitrogen 14 atoms of the explosive substance contained in the mine.

BACKGROUND ART

A number of Patent Publications on the technique of detection/removal of a mine have been applied not only in Japan but also in foreign countries, for instance References 1 to 4. However, not only the techniques described in the above-specified publications but also the techniques as described in many publications thus far published for detecting/removing a mine are detection methods for recognizing the mine as a foreign substance from the soil around it, in which the mine is buried, by employing an underground radar or a metal detector.

Publication 1: JP-A-2001-74387,
Publication 2: JP-A-2001-153597,
Publication 3: JP-A-06-506295, and
Publication 4: U.S. Pat. No. 6,411,208B1.

The mine detecting method thus far developed is roughly divided into two kinds. One is a method detecting the difference in physical properties between the mine and the soil around that, in which the mine is buried, and the other is a method for detecting the physical properties of the mine (or the explosive substance) itself directly.

The methods classified among the former include an electromagnetic induction method (metal detection), an electric wave method (dielectric rate), an electric survey method (specific resistance), a thermal survey method (heat capacity), an ultrasonic method (substance density), and so on. The methods classified among the latter include a nuclear magnetic resonance method (magnetic characteristics), a neutron method (radioactivation characteristics), a chemical method (bonding state of atoms), a biological method (with an antibody bio-film) and so on.

The nuclear magnetic resonance NMR method classified among the latter generally uses a nuclear magnetic resonance spectrometer, as is utilized at present in medical devices.

This NMR method, detecting a mine by means of the nuclear magnetic resonance, does not detect the differences in the physical properties such as the electric conductivity or the dielectric constant between the mine and the soil in which the mine is buried, as does the electromagnetic induction method (metal detector) or the electric wave method (underground radar). The NMR method directly detects the intrinsic nuclear magnetic field of the atoms composing the mine (or the explosive substance). The NMR method is accepted as excellent mine detecting means because it can detect the explosive substance of the detection target directly.

For the NMR method, however, a large-sized magnet is indispensable for generating an intense magnetic field. Thus, this NMR method utilizing nuclear magnetic resonance has a fatal defect when it is desired to reduce the size of the device. Therefore, the chemical substance detecting device according to the NMR method has been limited in practice to the MRI (Magnetic Resonance Imaging) for medical diagnosis, because the NMR method is viewed as not suited for a portable mine detecting device.

Therefore, the invention described in this application is presented to solve the problems identified in the prior art and to provide a mine detecting device, which is made so portable that it can be conveniently employed even outdoors.

SUMMARY OF THE INVENTION

In order to solve the aforementioned problems, according to the invention of this application, there is firstly provided a mine detecting device comprising an electromagnetic wave transmitter; an electromagnetic wave transmitting antenna; and a high-temperature superconducting quantum interference device SQUID for receiving the NQR signal of nitrogen 14 atoms contained in an explosive substance. The invention provides secondly a mine detecting device comprising an environmental magnetic field receiving SQUID; thirdly a mine detecting device characterized in that the cooling medium of the high-temperature superconducting SQUID and/or the environmental magnetic field receiving SQUID is liquid nitrogen; and fourthly a mine detecting device characterized in that the high-temperature superconducting SQUID and the environmental magnetic field receiving SQUID are connected with a differential circuit.

Moreover, the invention of this application provides fifthly a mine detecting device characterized by using a receiving coil connecting a first order differential or second order differential pickup coil of a normal conducting metal wire and an input coil for introducing the magnetic field into the SQUID housed in a magnetic shield; sixthly, a portable mine detecting device characterized in that the electromagnetic wave transmitting antenna and the high-temperature superconducting SQUID are arranged so that they can be gripped. Additionally, the electromagnetic wave oscillator, a high-temperature superconducting SQUID controller and a data processor can be driven by a battery. Seventhly, a mine detecting device, wherein the frequency of the transmitted electromagnetic wave is a radio wave in the band from 0.1 to 10 MHz; eighthly, a mine detecting device characterized by sweeping the transmitted electromagnetic wave over the 0.1 to 10 MHz band and utilizing the resonance signals of the NQR signal obtained; ninthly, a mine detecting device characterized in that the electromagnetic wave transmitting antenna has a directivity; and tenthly, a mine detecting device wherein a square wave is transmitted from the electromagnetic wave transmitting antenna, and the frequency spectrum obtained by the quick Fourier analysis of the signal detected by the high-temperature superconducting SQUID is compared with the spectral distributions of chemical substances from a database.

Figure 1:
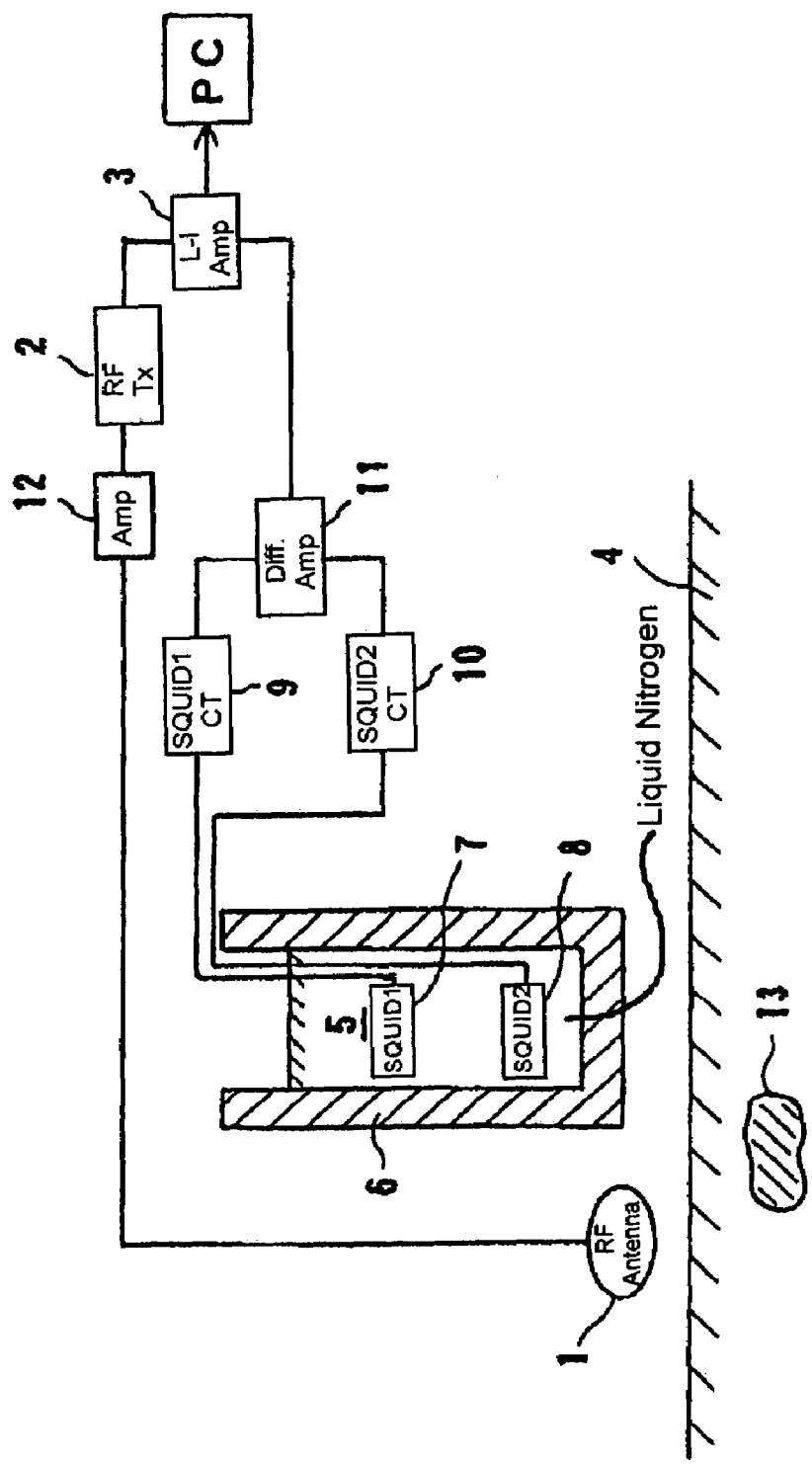
FIG. 1 is a diagram of the entire mine detecting device.

Here, reference numerals in the drawings designate the following components.

1 Radio Wave Transmitting Antenna
2 Radio Wave Transmitter
3 Lock-In Amplifier
4 Ground -continued 5 Liquid Nitrogen
6 Liquid Nitrogen Container
7 SQUID1
8 SQUID2
9 Electronic Circuit for SQUID1
10 Electronic Circuit for SQUID2
11 Differential Amplifier
12 Amplifier
13 Mine
15 Second order Differential Type Coil
16 Magnetic Shield
17 Magnetic Induction Coil

DETAIL DESCRIPTION OF THE INVENTION

According to the principle of the invention of this application, an explosive substance to be detected such as TNT (Trinitrotoluene) employed as mine explosive is detected by transmitting an AC electromagnetic field into the ground, causing the nuclear quadrupole resonance (abbreviated as "NQR") of nitrogen 14 atoms (14N) to generate electromagnetic radio waves intrinsic to these atoms. The invention is characterized by utilizing a superhigh-sensitivity magnetic sensor called a superconducting quantum interference device (as will be abbreviated into the "SQUID"), for detecting the low-frequency band, which has been especially difficult to detect.

Figure 3:
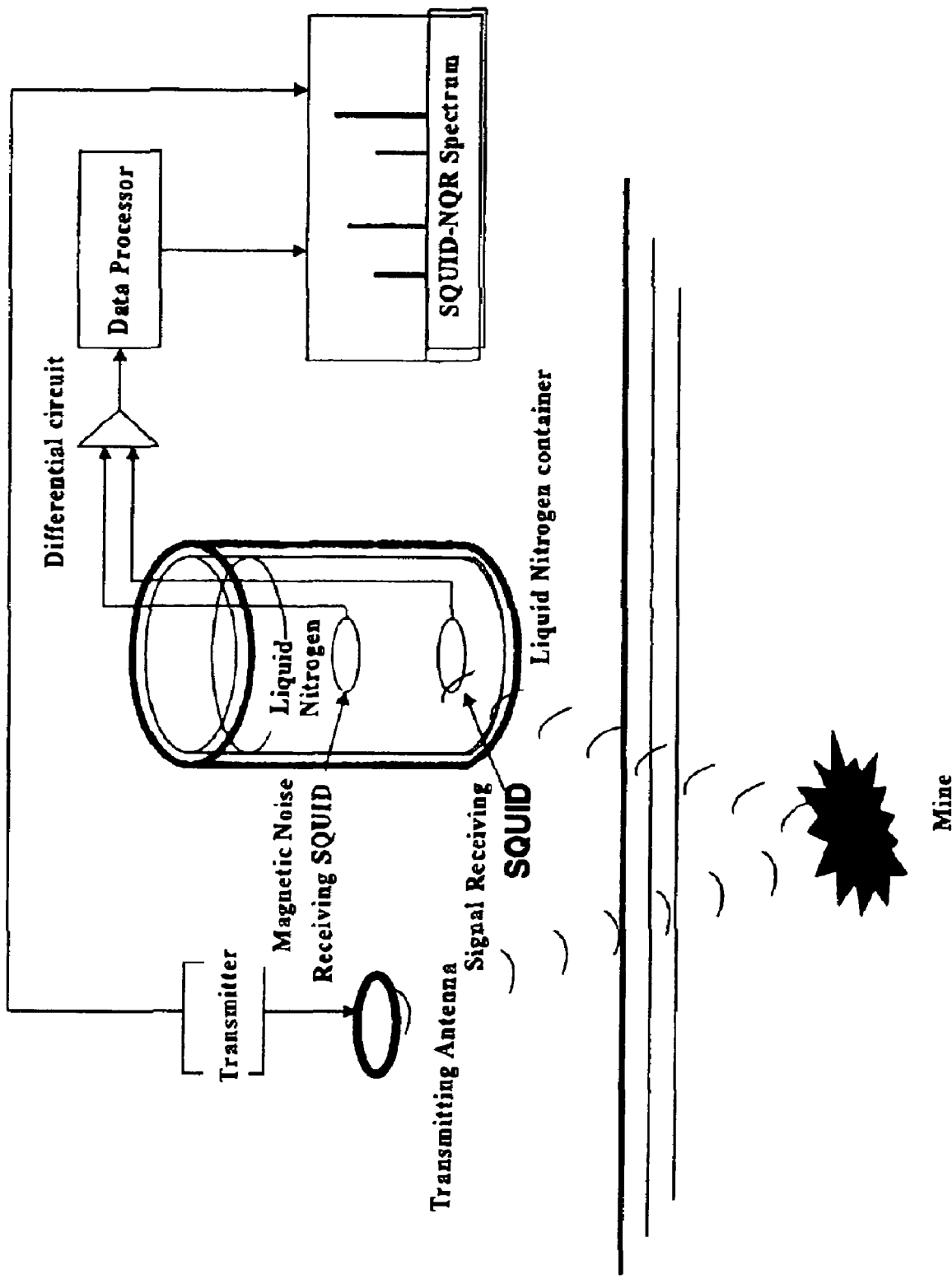
FIG. 3 is a schematic diagram showing the concept of the mine detecting device.

The concept of the mine detecting device combining the NQR signal and the SQUID is schematically shown in FIG. 3. A radio wave is transmitted from a radio wave transmitter through a radio wave transmitting antenna. The explosive substance, contained in a mine buried in the ground, is identified because when the mine is irradiated with the radio wave the mine resonates with the NQR and this signal is received by the SQUID, and by contrasting the NQR with known resonance frequencies by means of a data processor utilizing a personal computer or the like. The NQR employed in the mine detecting device of the invention of this application detects the substance on a principle like that of the NMR (Nuclear Magnetic Resonance Spectrometer). The essential difference between the NQR and the NMR is that the NMR rises in magnetic fields, whereas the NQR rises in an electric field gradient around an atomic nucleus so that it is advantageous for specifying a substance in a zero magnetic field.

Figure 4:
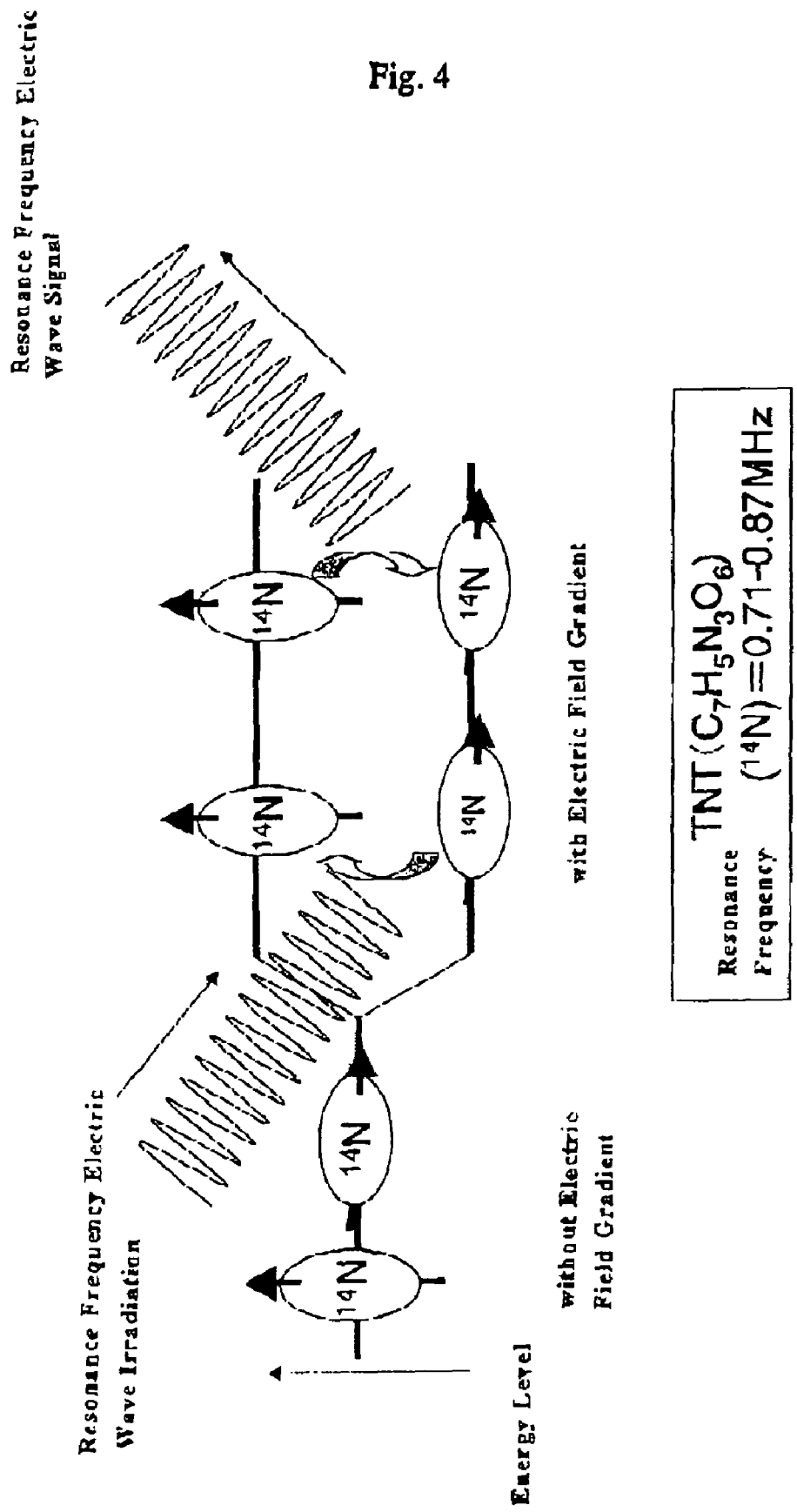
FIG. 4 shows the concept of a mine detection utilizing NQR.

The principle of the NQR is shown in FIG. 4. As shown in the schematic diagram of FIG. 4, an atom having nuclear spin of one or more is made to have a resonance frequency intrinsic to the atom by the interaction between the electric field gradient and the nuclear quadrupoles around the atomic nucleus so that the substance can be identified from that resonance frequency. Nowadays, the resonance frequencies intrinsic to several hundreds of thousands of chemical substances have already been examined to make it easy to detect the target explosive substance.

For example, most explosive substances are those containing nitrogen such as the TNT. This makes it possible to catch the NQR signal from the nitrogen 14 ($^{14}$N) having each spin of 1.

The electric waves to be usually employed for detecting the NQR signal are radio waves in the range of 10 MHz or less. Usually, the target is detected by bringing an antenna, for irradiating the electric wave of that range, closer to the target. However a remote explosive substance can be detected by using an electric wave transmitting antenna with directionality.

However, the resonance frequency caused by the NQR signal is generally only a few MHz (Megahertz), which is much lower than that of the ordinary NMR. This raises a problem that the electromagnetic wave detecting coil usually employed cannot not detect the explosive substance sufficiently.

Figure 5:
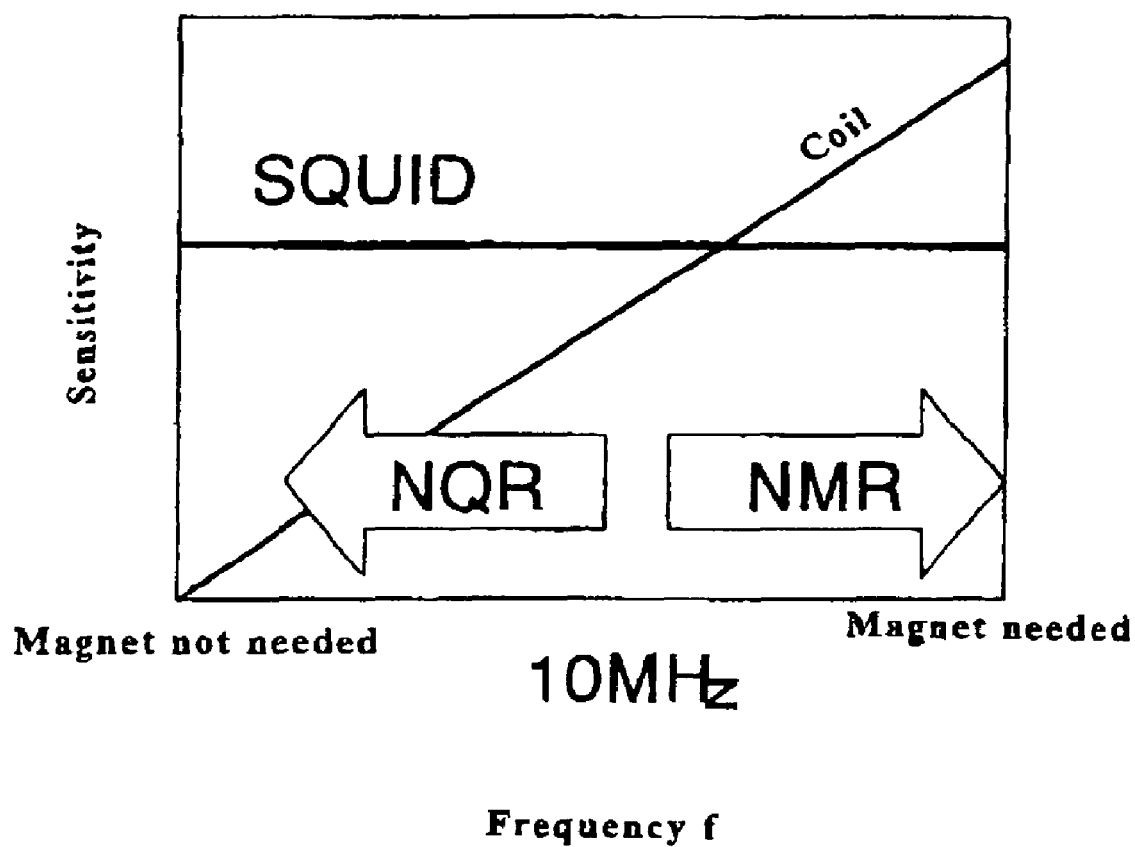
FIG. 5 is a diagram showing the relation between frequency and sensitivity.

Relations between that frequency (f) and the sensitivity are shown in FIG. 5. It is apparent from FIG. 5 that the reception sensitivity of the NQR signal by the electromagnetic wave detecting coil is seriously lowered in the low-frequency band but that the SQUID sensitivity is constant, independent of change in the frequency (f).

The invention of this application is contemplated to eliminate the defect of the mine detecting device utilizing the NQR signal, by using the SQUID as a detector in the cases where the resonance frequency has been too low to be detected sufficiently.

This SQUID is a high-sensitivity magnetic sensor utilizing superconducting quantization, and has a sensitivity one hundred times or more higher than that of the magnetic sensor of the prior art. Thus, it can detect a weak magnetic field one fifty millionth or less of the earth's magnetic field.

In the invention of this application, it is necessary to employ not the general SQUID using helium as a cooling medium but rather a high-temperature superconducting SQUID. This is because the SQUID of the prior art employing liquid helium as the cooling medium not only hard to handle but also has difficulties related to the high cost for the liquid helium and the large size of the heat insulation. Thus, it is thought difficult to utilize the SQUID for the portable mine detecting device.

On the other hand, the high-temperature superconducting SQUID is easy to handle and can employ the liquid nitrogen (at 77.3 K: −196° C.) at a low cost so that it is small and light. Moreover, the mine detecting device can be made portable by utilizing the high-temperature superconducting SQUID in the mine detecting device. In the invention of this application, therefore, the SQUID implies the high-temperature superconducting SQUID.

However, the superhigh-sensitivity magnetic sensor utilizing the SQUID is so extremely sensitive as to invite a problem that the mine detecting device in actual use may pick up noise. In order that the noise may be eliminated to allow detection of the presence of the explosive substance precisely, an environmental noise measuring SQUID has to be connected to eliminate the noise. This mode is shown in FIG. 3. For this noise elimination, this mine detecting device is provided with not only the signal receiving SQUID but also the magnetic noise receiving SQUID, and thus detects only the NQR signal from the explosive substance.

Here, the signal receiving SQUID or the magnetic noise receiving SQUID can be cooled down merely by dipping it in a liquid nitrogen container filled with the liquid nitrogen.

Then, the environmental noises are removed by connecting the signal receiving SQUID and the magnetic noise receiving SQUID with a differential circuit. The signals thus cleared of the environmental noises are processed by a data processor such as a personal computer.

Here, the mine detecting device of the invention of this application is characterized in that it is enabled to identify and detect a plurality of substances simultaneously by changing the frequency. The band of the frequency at this time should not be especially limited but preferably falls within the range of 0.1 to 10 MHz.

As has been detailed hereinbefore, the mine detecting device of the invention of this application has many features distinguishing it from other mine detecting devices. The excellent portions of the invention of this application may be enumerated as follows.

(a) The device can detect the explosive substance itself directly.

(b) The device can detect a plurality of different explosives (or mines) simultaneously by changing the frequency.

(c) The device can be made small and portable.

(d) The device needs no magnetic field for the detection.

(e) The device can perform a high-sensitivity measurement by using the SQUID as the sensor.

(f) The device can operate with just a small quantity of liquid nitrogen by utilizing the high-temperature superconducting SQUID.

The invention of this application has the features described above, and is described in detail in connection with its modes of embodiment utilizing that device.

EMBODIMENTS

Embodiment 1

FIG. 1 is an entire diagram showing a mine detecting device as an embodiment. A radio wave (0.1 to 10 MHz) for the detection is transmitted from a radio wave transmitter (2) and amplified by an amplifier (12). The amplified radio wave is then introduced into a radio wave transmitting antenna (1) so that the radio wave is transmitted toward the ground surface.

A resonant NQR signal is transmitted from a mine (13) having received that radio wave and is received by a signal receiving SQUID1 (8). An SQUID2 (7) is provided for measuring the environmental magnetic noises. As a result, signals passing through the individual electronic circuits (10) and (9) of the SQUID1 (8) and the SQUID2 (7) are outputted to a differential amplifier (11) where the NQR signal is cleared of the environmental noises and only the NQR signal is introduced into a lock-in amplifier (3).

The lock-in amplifier (3) takes in the signal of the radio wave transmitter (2) as a reference signal so that it can extract only the signals introduced into the differential amplifier (11) that have the frequency of the radio wave, thereby reducing the noise. That signal is subjected to an A/D conversion and inputted to a processor utilizing a personal computer (PC) or the like. This signals are integrated and averaged 100 to 10,000 times, so that the final data has reduced environmental noise. These operations are repeated at a frequency of 10 Hz while varying the radio frequency from 0.1 to 10 MHz so that the spectrum of the entire range of 0.1 to 10 MHz can be sampled.

Additionally, for simplification, the efficiency of the mine detection can be raised by performing the operations thus far described for only a frequency known to be significant (see Table 1).

TABLE 1

| NQR Spectrum of Typical Explosives Unit (MHz) | | | | |
|---|---|---|---|---|
| TNT | RDX | HMX | Nitrotoluene | |
| Trinitrotoluene $C_7H_5N_3O_6$ | Hexogen $C_3H_6N_6O_6$ | Octogen $C_4H_8N_8O_8$ | p-nitrotoluene p-$C_7H_7NO_2$ | m-nitrotoluene m-$C_7H_7NO_2$ |
| 0.871 | 5.24 | 5.306 | 1.198 | 1.19 |
| 0.8604 | 5.192 | 5.068 | 0.911 | 0.91 |
| 0.845 | 5.047 | 3.737 | | |
| 0.9438 | 3.458 | 3.625 | | |
| 0.838 | 3.41 | 1.564 | | |
| 0.769 | 3.359 | 1.441 | | |
| 0.752 | 1.782 | | | |
| 0.743 | 1.688 | | | |
| 0.716 | | | | |

SOURCE

LANDOLT-BÖRNSTEIN

Vol. 20

Nuclear Quadrupole Resonance Spectroscopy Data

Editors: K.-H. Hellwege and A. M. Hellwege

Springer-Verlag Berlin Heidelberg 1988

Specifically, a search for TNT, nitrotoluene, RDX and HMX was executed. The result was that the NQR signal for all the explosives in amounts down to the detection limit of the SQUID could be clearly confirmed. Below is given a detailed description of the search for TNT which is frequently employed in mines.

100 g of TNT was buried in the ground (4), and the NQR signal was detected by means of a SQUID 5 cm away. The NQR signal had an intensity of about 1 pT (picoteslas). The SQUID employed in this method had a superconducting film of $Y_1Ba_2Cu_3O_7$ having a thickness of 0.1 microns and formed on the substrate of a square of 10 mm. For the measurements, the electronic circuit of FIG. 1 was used, and the output of the lock-in amplifier was received and monitored by the processor utilizing the personal computer (PC) or the like. The integration averaging operations were done 1,000 times. This SQUID has a magnetic resolution of about 0.01 pT (picoteslas) so that the NQR signal of the TNT could be clearly received.

Embodiment 2

Figure 2:
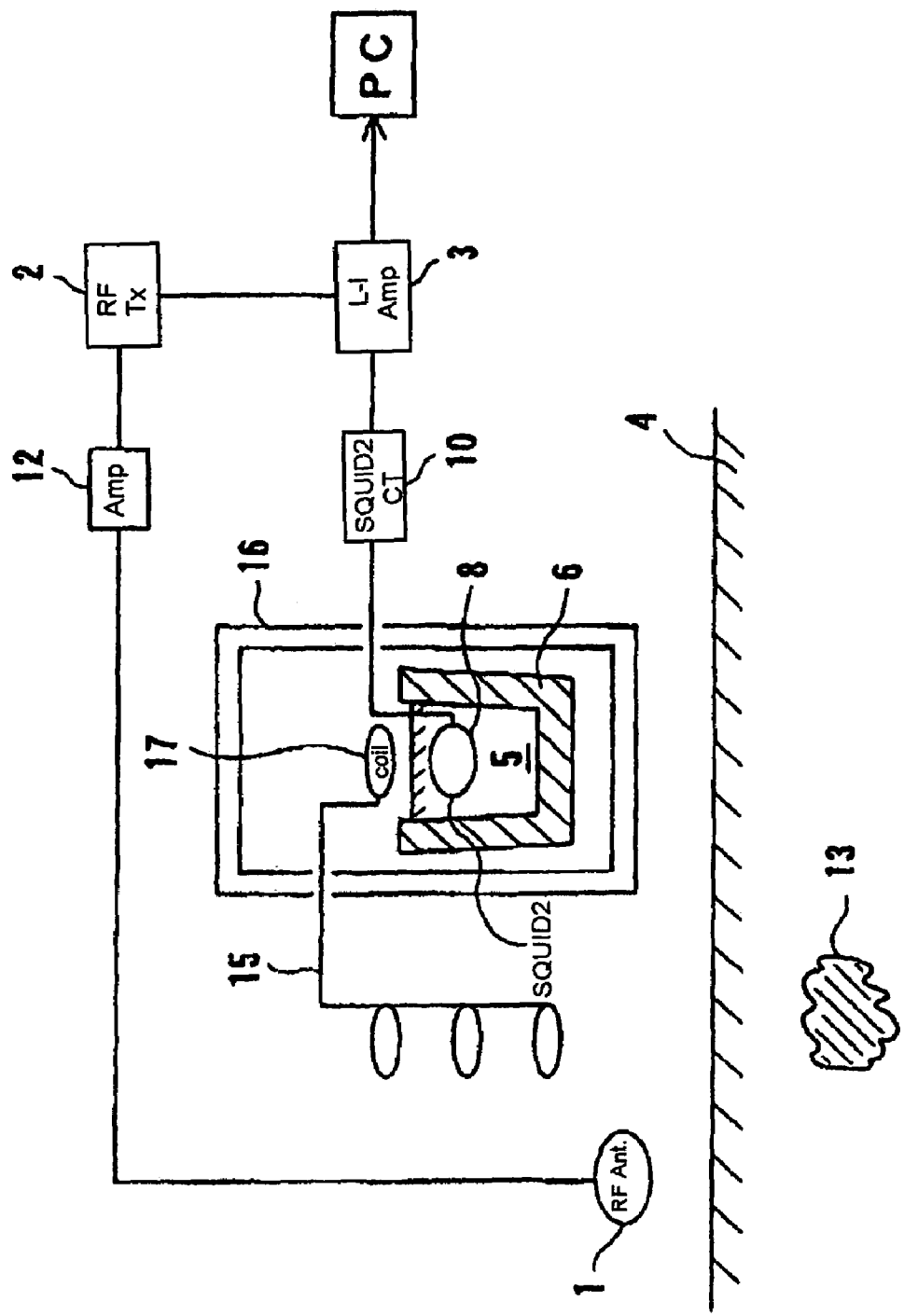
FIG. 2 is a diagram of the entire mine detecting device employing a magnetic shield.

FIG. 2 is a diagram of the entire mine detecting device, which can measure with minimum influence of environmental noise. In this mine detecting device, the NQR signal is caught by a second order differential coil (15), its magnetic field is taken in by a magnetic induction coil (17) and outputted as a SQUID magnetic field, and this is detected by the SQUID.

The second order differential coil (15) has 100 upper turns, 200 middle turns and 100 lower turns and a diameter of 5 cm. The upper and lower coils are turned in the common direction, but the middle coil is turned in the reverse direction. Moreover, the magnetic induction coil (17) has 200 turns and a diameter of 5 cm. The SQUID (8) dipped in liquid nitrogen (5) is disposed just under the magnetic induction coil (17), thereby to monitor the magnetic field. The magnetic induction coil (17) and the SQUID (8) are disposed in a magnetic shield (16). This magnetic shield (16) has a double structure, as shown in FIG. 2, and is made of Permalloy of a high magnetic permeability. This magnetic shield (16) made of a double cylinder (having a bottom and an upper cover) prevents any environmental magnetic field from being applied to the SQUID. It has, therefore, been confirmed that the SQUID (8) worked stably. The same method as that of the embodiment was used for the experiments to detect the explosives. The NQR signal were about 1 pT (picotesla) whereas the SQUID noises were 0.01 pT (picoteslas), thus confirming that the NQR signal had sufficient strength for the measurements.

The mine detectors of the prior arts are mostly metal detectors. However, recent mines have increasingly been non-metallic ones such as plastic bombs. The mine detecting device of the invention of this application can be applied to such mines of plastics and can also be made portable. Thus, this mine detecting device can be expected to be used widely as the mine detector in the future.

The invention claimed is:

1. A portable mine detecting device comprising:
   an electromagnetic wave transmitter for generating an electromagnetic wave;
   an electromagnetic wave transmitting antenna connected to said electromagnetic wave transmitter and being configured to transmit the electromagnetic wave in a direction of an explosive substance; and
   a high-temperature superconducting quantum interference device (SQUID) for receiving and processing a nuclear quadrupole resonance (NQR) signal from a plurality of nitrogen 14 atoms contained in the explosive substance, wherein the NQR signal is generated as a result of the plurality of nitrogen 14 atoms in the explosive substance being irradiated by the transmitted electromagnetic wave.

2. The portable mine detecting device of claim 1, further comprising an environmental magnetic field receiving SQUID.

3. The portable mine detecting device of claim 2, further comprising a cooling medium configured to cool at least one of said high-temperature superconducting SQUID and said environmental magnetic field receiving SQUID, said cooling medium being liquid nitrogen.

4. The portable mine detecting device of claim 3, further comprising a differential circuit connected to said high-temperature superconducting SQUID and said environmental magnetic field receiving SQUID.

5. The portable mine detecting device of claim 3, further comprising a receiving coil operable to be connected to a first order differential pickup coil or a second order differential pickup coil comprised of a conducting metal wire, and an input coil for introducing a magnetic field into said high-temperature superconducting SQUID housed in a magnetic shield.

6. The portable mine detecting device of claim 2, wherein said electromagnetic wave transmitting antenna and said high-temperature superconducting SQUID are configured to be held; and said electromagnetic wave transmitter, said high-temperature superconducting SQUID, and a data processor are configured to be powered by a battery.

7. The portable mine detecting device of claim 2, wherein the transmitted electromagnetic wave has a radio wave frequency band of 0.1 to 10 MHz.

8. The portable mine detecting device of claim 1, further comprising a cooling medium configured to cool said high-temperature superconducting SQUID, said cooling medium being liquid nitrogen.

9. The portable mine detecting device of claim 8, further comprising a differential circuit connected to said high-temperature superconducting SQUID and another SQUID.

10. The portable mine detecting device of claim 9, wherein said electromagnetic wave transmitting antenna and said high-temperature superconducting SQUID are configured to be held; and said electromagnetic wave transmitter, said high-temperature superconducting SQUID, and a data processor are configured to be powered by a battery.

11. The portable mine detecting device of claim 9, wherein the transmitted electromagnetic wave has a radio wave frequency band of 0.1 to 10 MHz.

12. The portable mine detecting device of claim 8, further comprising a receiving coil connected to a first order differential pickup coil or a second order differential pickup coil comprised of a conducting metal wire, and an input coil for introducing a magnetic field into said high-temperature superconducting SQUID housed in a magnetic shield.

13. The portable mine detecting device of claim 12, said electromagnetic wave transmitting antenna and said high-temperature superconducting SQUID configured to be held; and said electromagnetic wave transmitter, said high-temperature superconducting SQUID, and a data processor are configured to be powered by a battery.

14. The portable mine detecting device of claim 12, wherein the transmitted electromagnetic wave has a radio wave frequency band of 0.1 to 10 MHz.

15. The portable mine detecting device of claim 8, wherein said electromagnetic wave transmitting antenna and said high-temperature superconducting SQUID are configured to be held; and said electromagnetic wave transmitter, said high-temperature superconducting SQUID, and a data processor are configured to be powered by a battery.

16. The portable mine detecting device of claim 8, wherein the transmitted electromagnetic wave has a radio wave frequency band of 0.1 to 10 MHz.

17. The portable mine detecting device of claim 1, wherein said electromagnetic wave transmitting antenna and said high-temperature superconducting SQUID are configured to be held; and said electromagnetic wave transmitter, said high-temperature superconducting SQUID, and a data processor are configured to be powered by a battery.

18. The portable mine detecting device of claim 1, wherein the transmitted electromagnetic wave has a radio wave frequency band of 0.1 to 10 MHz.

19. The portable mine detecting device of claim 1, wherein the transmitted electromagnetic wave is transmitted toward the explosive substance by varying the transmitted electromagnetic wave between a 0.1 to 10 MHz band, and the NQR signal from the explosive substance is obtained as a result of the transmitted electromagnetic wave.

20. The portable mine detecting device of claim 1, wherein a square wave is transmitted from said electromagnetic wave transmitting antenna so that a frequency spectrum obtained by a quick Fourier analysis of the NQR signal detected by said high-temperature superconducting SQUID is compared with spectral distributions of chemical substances contained in a database.

* * * * *

UNITED STATES PATENT AND TRADEMARK OFFICE
CERTIFICATE OF CORRECTION

PATENT NO.       : 7,394,250 B2
APPLICATION NO.  : 10/536020
DATED            : July 1, 2008
INVENTOR(S)      : Hideo Itozaki et al.

It is certified that error appears in the above-identified patent and that said Letters Patent is hereby corrected as shown below:

On the Title page item (73), line 1, change "National Institute of Materials Science" to --National Institute for Materials Science--.

Signed and Sealed this

Sixteenth Day of September, 2008

JON W. DUDAS
*Director of the United States Patent and Trademark Office*